Patented Aug. 28, 1945

2,383,792

UNITED STATES PATENT OFFICE 2,383,792

PROTEIN FURFURYL ALCOHOL-FORMALDEHYDE COMPOSITION

Mortimer T. Harvey, South Orange, N. J., assignor to The Harvel Research Corporation, a corporation of New Jersey No Drawing. Application October 8, 1942, Serial No. 461,334

5 Claims. (Cl. 260—6)

This invention relates to a resinous material made with a protein and the reaction product of furfuryl alcohol and formaldehyde. In my copending patent application Ser. No. 436,475 it is pointed out that furfuryl alcohol reacts with formaldehyde in the presence of weak acids. It was pointed out that furfuryl alcohol can be made to take up from one-half mole of formaldehyde up to and including two moles.

This reaction product shows unique properties over other resins now being used. It was found that in the intermediate stage it may be diluted with various quantities of water. For example, at the end of the refluxing period all the water of formaldehyde is in solution. If this product is further polymerized the quantity of water which it will further take up is decreased, but at practically all the intermediate stages some water may be incorporated either in solution or emulsion form. On the other hand, when the product is completely cured, the water absorption is in the order of one-half that of a phenol formaldehyde resin. Another property which was found is that this intermediate product is capable of taking up and dissolving proteins and, when used in the cured stage, the protein is retained in a homogeneous phase.

Small amounts of protein help to form smooth baked films of the final condensation product without impairing the water resistance. When small amounts of furfuryl alcohol-formaldehyde reaction products are used with large percentages of proteins, the water resistance is improved and the strength of the film's adhesiveness is greatly enhanced and also the tendency of the film to mold and deteriorate is considerably lessened.

In the same way when proteins and the furfuryl alcohol-formaldehyde condensation products are put together either alone or with fillers such as wood flour, barytes, talc, hard rubber dust, soya bean flour and the like, molded products made from this have surprisingly excellent water resistance and impact strength.

Illustrative examples of proteins which can be used with this reaction product in the practice of the present invention are gelatin, animal glue, blood albumin, casein, vegetable proteins, such as those obtained from soya bean flour compounds such as polyamide polybasic acid condensation may also be used.

Examples of reaction products of furfuryl alcohol, formaldehyde and a protein are listed as follows:

A. One mole of furfuryl alcohol to one mole of formaldehyde.

The charge consists of 1200 pounds of formaldehyde solution (37% HCHO), 1500 pounds of furfuryl alcohol and 75 pounds of lactic acid (80%).

The above or equivalent quantities of materials are refluxed at 205–210° F. for about two and one-half hours, or until the reaction between the formaldehyde and furfuryl alcohol is complete. To test for completeness of this reaction, take ten cc. of the product, which is a thermosetting liquid resin, shake in graduate with ninety cc. of water, and let settle. When two cc. of resin settle in bottom of graduate, reaction is complete.

The reaction mixture is dehydrated at atmospheric pressure and at about 200–205° F. until about twenty-two gallons of water have been distilled. Suction is then applied on the still and dehydration continued at about 26 inches vacuum, the temperature not exceeding 205° F. The viscosity is checked frequently. When the viscosity at 25° C. increases to 378 centipoises, mixture is chilled quickly to 150° F. and screened through 60 mesh into drums. The yield is about 1800 pounds.

B. One mole of furfuryl alcohol to one-half mole of formaldehyde.

Five hundred grams of furfuryl alcohol, about two hundred grams of commercial formaldehyde solution and about twenty grams of lactic acid (80%) are refluxed for about two hours and then dehydrated under vacuum.

C. One mole of furfuryl alcohol to three moles of formaldehyde.

One hundred grams of furfuryl alcohol and two hundred forty grams of commercial formaldehyde solution, together with three grams of lactic acid (80%) are heated under a reflux condenser and at refluxing temperature for two and one-half hours, that is, until a light separation of an aqueous layer appears, after which the reaction mass is dehydrated under vacuum. The distillate is one hundred sixty-six grams and the residue, which is a thermosetting resinous liquid, is one hundred sixty-four grams. After the deduction for lactic acid, the weight of this said resinous liquid indicates that about two molecular equivalents of formaldehyde condense with one molecular equivalent of furfuryl alcohol to form said resinous liquid.

*Example 1.*—One hundred parts by weight of liquid resin of Example A above, and ten parts of oil-free soya bean flour were heated together on water bath at 200° F. for about 15 minutes, one hundred ten parts of wood flour were added and the whole milled on hot differential rolls to incorporate the wood flour properly. This product may be cured at 350° F. in about five minutes to give molded products of excellent tensile strength.

*Example 2.*—Eighty parts by weight of liquid resin of Example A, about twenty parts of oil-free soya bean flour, eighty-five parts of wood flour, eight parts of hexamethylene tetramine, and four parts of hydrated lime were milled together on hot differential rolls and then cured at between 310–380° F. for from two minutes to fifteen minutes.

*Example 3.*—Five hundred grams of furfuryl alcohol, about two hundred grams of commercial formaldehyde solution and about twenty grams of lactic acid (80%), fifty grams of soya bean flour were refluxed for about two hours and then dehydrated under vacuum. To this reaction mixture, five hundred fifty grams of wood flour, ten grams of calcium stearate, twenty-five grams of hexamethylene tetramine were added and mixed together well, dried in air or vacuum to remove moisture, worked on hot differential rolls to form a fairly dry product, and ground and then molded at 300° F. to 380° F.

*Example 4.*—One hundred parts of gelatin, animal glue or blood albumin, and three hundred parts of water were mixed together and heated on a steam bath until a solution was obtained. Ten parts of liquid resin of Example C, above, were added and well stirred. This product can be applied to wood, paper surfaces, or plaster walls and dried with or without heat for adhesion for coatings.

*Example 5.*—One hundred parts of casein, two hundred parts of water and ten parts of sodium carbonate were mixed together and put on a steam bath and stirred until a solution was obtained, and one hundred parts of liquid resin of Example A, above, were then added. This product can be applied to surfaces for adhesion of coatings to paper, plaster or cement. Where necessary, this resin may be heat cured.

*Example 6.*—One thousand parts of liquid resin of Example A, nine hundred parts of isopropyl alcohol, one hundred parts of water and seventy-five parts of a condensation product of polyamide-polybasic acid were heated together with stirring until a solution was obtained. This product can be used for coatings, molded articles or adhesives. This solution may be speeded up by dissolving the polyamide polybasic acid condensation product first in the isopropyl alcohol, water solution and then incorporating the liquid resin of Example A. This seems to work a little faster, but the end product is about the same.

Having thus described my invention, what I claim and desire to protect by Letters Patent is:

1. A composition comprising a protein dissolved in a liquid furfuryl alcohol-formaldehyde fusible resin.

2. A moldable, thermosetting composition comprising a filler, a liquid fusible furfuryl alcohol-formaldehyde resin and a protein dissolved in said resin.

3. A composition comprising a fusible liquid furfuryl-alcohol-formaldehyde resin and gelatin dissolved therein.

4. A composition comprising a fusible liquid furfuryl-alcohol-formaldehyde resin and casein dissolved therein.

5. A composition comprising a fusible liquid furfuryl-alcohol-formaldehyde resin and soya-bean protein dissolved therein.

MORTIMER T. HARVEY.